US005472558A

United States Patent [19]

Lafond

[11] Patent Number: 5,472,558

[45] Date of Patent: Dec. 5, 1995

[54] STRIP APPLYING HAND TOOL WITH CORNER FORMING APPARATUS

[76] Inventor: Luc Lafond, 225 Donlea Drive, Toronto, Ontario, Canada, M4G 2N3

[21] Appl. No.: 59,960

[22] Filed: May 13, 1993

Related U.S. Application Data

[63] Continuation-in-part of Ser. No. 892,038, Jun. 2, 1992, abandoned.

[30] Foreign Application Priority Data

Jun. 3, 1991 [CA] Canada .................................. 2043768

[51] Int. Cl.$^6$ ...................................................... B32B 31/00

[52] U.S. Cl. .......................... 156/523; 156/101; 156/250; 156/391; 156/574

[58] Field of Search .................................... 156/101, 102, 156/211, 250, 256, 391, 486, 510, 513, 514, 523, 574, 252, 253

[56] References Cited

U.S. PATENT DOCUMENTS

| | | | |
|---|---|---|---|
| 2,916,079 | 12/1959 | Schiefer | 156/391 |
| 3,730,815 | 5/1973 | Terzian | 156/527 |
| 3,733,237 | 5/1973 | Wolff | 156/468 |
| 4,060,444 | 11/1977 | Schweig, Jr. et al. | 156/391 |
| 4,072,554 | 2/1978 | McKibben | 156/514 |
| 4,600,466 | 7/1986 | Herrmann | 156/391 |
| 4,623,421 | 11/1986 | Cardin | 156/523 |
| 4,699,686 | 10/1987 | Franke | 156/579 |
| 4,759,810 | 7/1988 | Jackson et al. | 156/64 |
| 4,769,105 | 9/1988 | Lisec | 156/468 |
| 5,068,004 | 11/1991 | Moll | 156/513 X |

FOREIGN PATENT DOCUMENTS

| | | |
|---|---|---|
| 1234682 | 4/1988 | Canada . |

*Primary Examiner*—James J. Engel
*Attorney, Agent, or Firm*—McFadden, Fincham

[57] ABSTRACT

There is disclosed a strip applying tool for applying strip material to substrates. The tool includes a slidably mounted punching member to remove a portion of the strip material thereby facilitating the formation of a corner while maintaining the strip in a continuous uninterrupted length. The tool further provides a channel extending therein to receive strip material which provides a guide wall to permit the application of the strip to the substrate while maintaining a lower surface of the tool above the substrate to prevent moving or scratching of the substrate.

18 Claims, 4 Drawing Sheets

STRIP APPLYING HAND TOOL WITH CORNER FORMING APPARATUS

This application is a continuation-in-part application of U.S. Ser. No. 07/892,038 filed Jun. 2, 1992, now abandoned.

FIELD OF THE INVENTION

This invention relates to a strip applying tool for applying strip material to a pair of opposed substrates and more particularly, it relates to a strip applying tool which includes a punching device for removing a portion of the strip to form a corner therein simultaneously during the application procedure.

BACKGROUND OF THE INVENTION

Numerous strip applying tools have been proposed in the art, however, these tools have limitations in that many of them incorporate a superfluous amount of moving parts all of which are susceptible to mechanical failure. In addition, during an application procedure of strip material to a substrate and more particularly, when a corner needs to be formed in the strip, the procedure using known tools, must be interrupted and the corner formed therein. As such, this not only has a negative impact on productivity, but additionally provides a potential "weak spot" in terms of the insulation capacity of the strip.

SUMMARY OF THE INVENTION

One object of the present invention is to provide an improved strip applying hand tool.

Another object of the present invention is to provide a hand tool for applying strip material to a substrate having an edge and a major face comprising:

- a body having a lower surface and a channel extending therethrough for receiving strip material therein;
- a substrate positioning member adjacent the channel on the lower surface of the body for guiding the tool along the edge of the substrate, the lower surface of the body being elevated from the major face when the strip material is fed through the channel; and
- punch means slidably mounted on the body for removing a portion of the strip material.

The strip material generally includes materials such as butyl polymers, silicones, polyvinyl polymers and other such insulating bodies for application to substrates e.g. glass lites for fabrication of insulated glass assemblies.

The positioning member may comprise any material which provides low friction enabling the lower surface of the body to slide freely along an edge of the substrate without substantial wear; a suitable material to achieve this purpose may be, for example, Teflon™.

The channel within which strip material is fed in the tool includes a guide wall which is angularly inclined relative to the lower surface of the tool. Guides at the forward and rearward ends of the guide wall provide pressurable application of the strip to the substrate.

The width of the strip is preferably greater than the distance between the guide wall and the rearward roller. In this arrangement, the lower surface of the tool remains out of contact with the substrate thus avoiding any marring or scratching of the substrate surface.

The tool according to the present invention additionally permits the user to form a groove within the strip to allow the same to pivot or flex at that point. This feature allows the formation of "corners" in the strip simultaneously during an application procedure. Thus, according to a further object of the present invention, there is provided a hand tool for applying strip material to a substrate having an edge and a major face comprising:

- a main body having a lower surface and a channel extending therethrough for receiving strip material;
- a substrate positioning member adjacent the channel on the lower surface for guiding the tool along the edge of the substrate, the lower surface of the body being elevated from the major face when the strip material is fed through the channel;
- a slidable punch member slidably mounted within the body adapted to remove a portion of the strip to form a pivot point therein, the punch member being slidable from a first non-punching position wherein the punch member is spaced from the strip material to a punching position wherein the punch member is within the strip material; and
- actuation means for effecting movement of the punch member between the first and second positions.

The slidable punch member is preferably mounted adjacent the front end of the body in operative association with the strip channel. The punch member provides a hollow punch for removing a section of the strip material from the strip to provide the flex point for a corner while the strip is fed through the channel in an uninterrupted manner. The flex point is spaced inwardly from the outer edge of the strip so that the strip remains continuous thus substantially reducing energy loss at this point.

To effect severance of the strip material once the sides of a substrate have had strip material applied thereto, there is provided a blade member connected to the punch member. For a cutting procedure, the blade is movable in concert with the punch member. This movement may be effected by a handle having a linking member extending within the body to link the handle with the blade.

The punch member may be actuated by any suitable means e.g. manually, pneumatically or hydraulically. In a preferred form, the actuation of the punch will be achieved by the use of a pneumatic force.

The blade member includes a projecting element to permit releasable cooperative engagement with the punch.

According to a further aspect of the present invention, there is provided a method of placing a strip of material proximate an edge of a substrate having a major face comprising the steps of:

- providing a length of sealant strip from a supply thereof;
- providing a hand tool having a lower surface and strip feeding channel therein angularly inclined to the lower surface;
- feeding a length of the strip into the channel such that the lower surface is elevated from the major face;
- effecting securement of said strip to said edge of the substrate; and
- notching the strip with the tool at a corner of the substrate to facilitate securement of the strip around a corner edge of the substrate.

Having thus generally described the invention, reference will now be made to the accompanying drawings illustrating preferred embodiments.

DETAILED DESCRIPTION OF THE PREFERRED EMBODIMENTS

Figure 1:
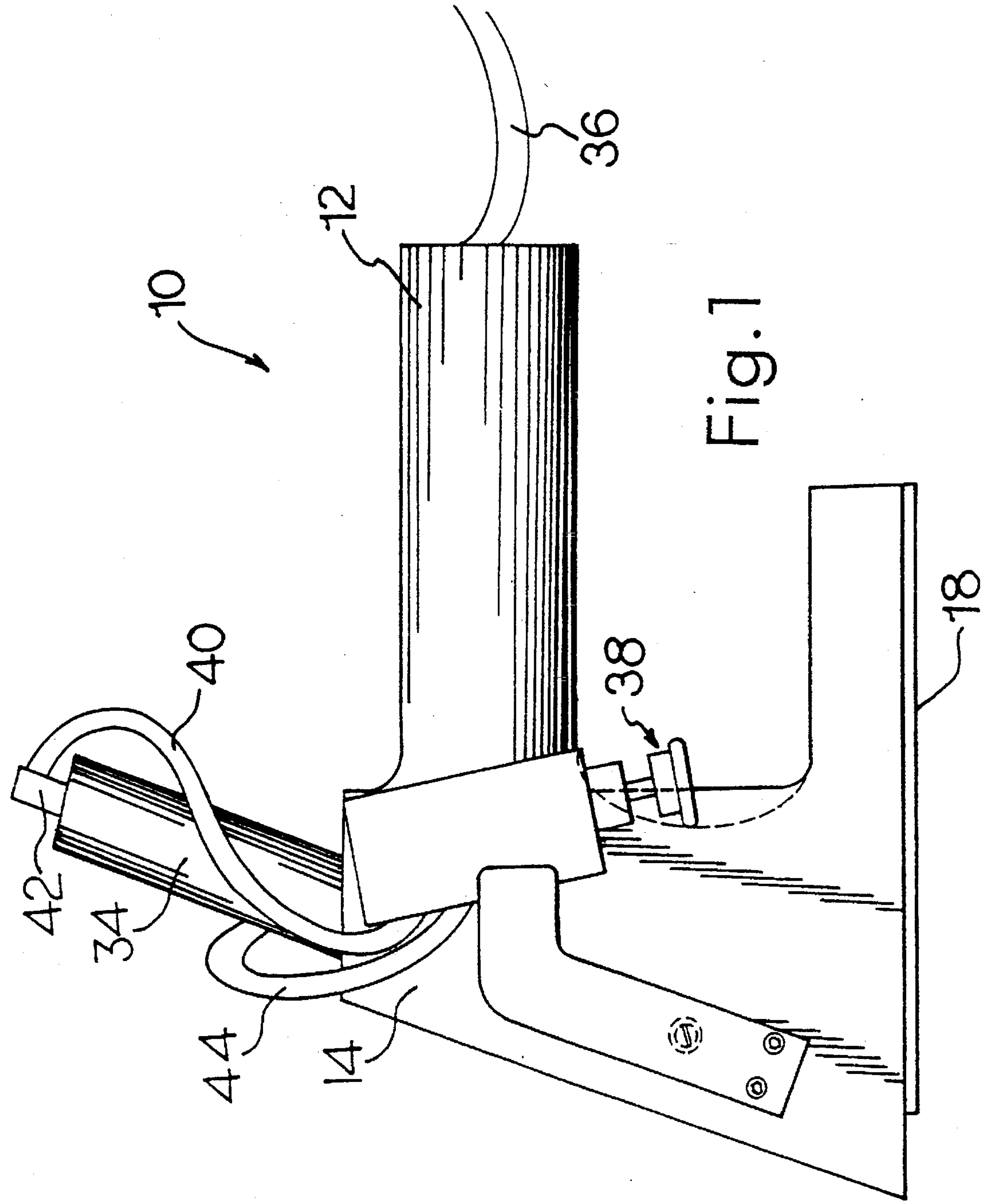
FIG. 1 is a side view of the hand tool of the present invention.

Referring now to FIG. 1, the hand tool, generally represented by numeral 10, includes a handle 12, a central body portion 14 and a lower surface 16, the latter including a positioning member 18 extending the length of the lower surface 16. The positioning member 18 preferably comprises a tough material e.g. wood for sliding guided contact on the peripheral edge of the substrate while the tool is moved and guided therealong to apply the strip material to the substrate.

Figure 2:
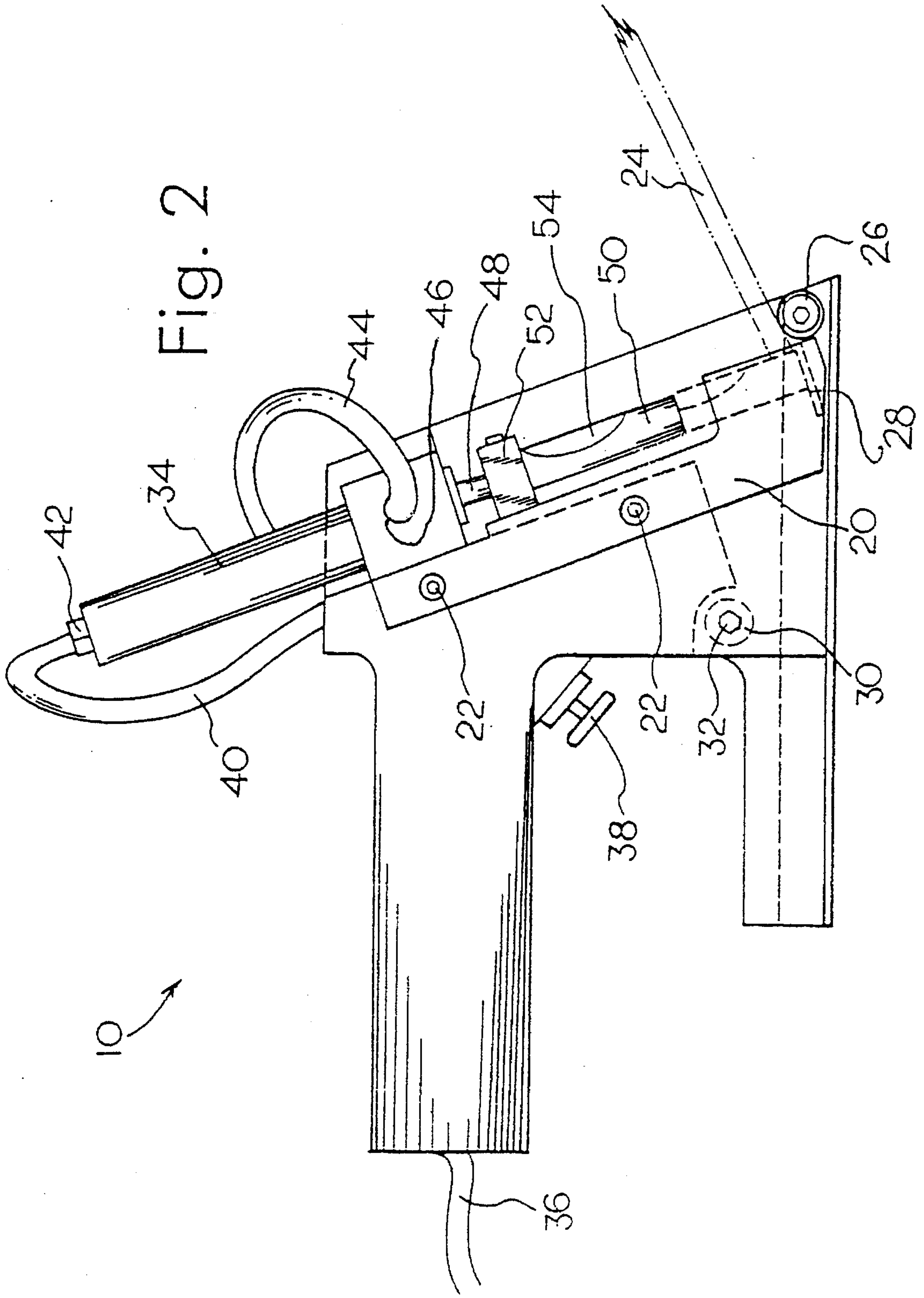
FIG. 2 is a partially cut-away side view of FIG. 1.

Referring now to FIG. 2, in which the opposite side of the tool is shown to that of FIG. 1, the tool includes a plate 20 connected to the central body portion 14 in spaced relation thereto by fasteners 22. The spaced relationship of plate 20 relative to body portion 14 defines an open ended channel and is sufficient to permit passage of sealant strip material 24 therethrough. Adjustment of fasteners 22 permit a change in the width of the channel to accommodate differently sized strip material.

A forward guide member 26 guides strip material 24 in the channel between plate 20 and body portion 14 and more particularly, over punch stop means 28. The stop means 28 is inclined relative to lower surface 16 and spaced therefrom a distance less than the width of the strip material. The stop means 28 directs the strip material 24 downwardly and beyond lower surface 16 (discussed in further detail hereinafter).

A rearwardly directed pressing pin 30 extends from within body 14 and through plate 20. Pin 30 is adjustable via a fastener 32 such that same may be urged into contact with strip 24 to permit the strip to extend beyond the lower surface of the tool 10 to prevent contact of the surface 16 with a substrate (not shown) on which the strip is being placed. The pin 30 may rotate to permit easy transportation of strip 24.

Mounted to the tool 10 adjacent main body portion 14 is a pneumatic cylinder 34. A primary fluid line 36, which is adapted for connection with a fluid supply source (not shown), supplies pressurized air to the cylinder 34. An actuating switch 38 is positioned intermediate line 36 and cylinder 34. An inlet hosing 40 extends from switch 38 to an inlet 42 on cylinder 34. Outlet hosing 44 extends from outlet 46 on cylinder 34 to switch 38.

A piston 48 is slidably mounted within cylinder 34 for reciprocal movement. A punch member 50 having a guide 52 is mounted to an end of piston 48 and facilitates guided movement of punch 50 between body portion 14 and plate 20.

Figure 4C:
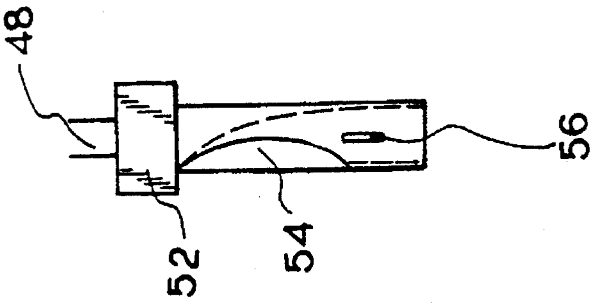
FIGS. 4A, B and C are sequential views of the blade member during a punch material removing and strip cutting procedure.
Figure 4B:
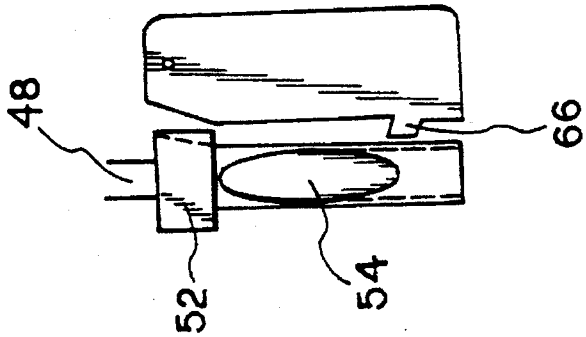
Figure 4A:
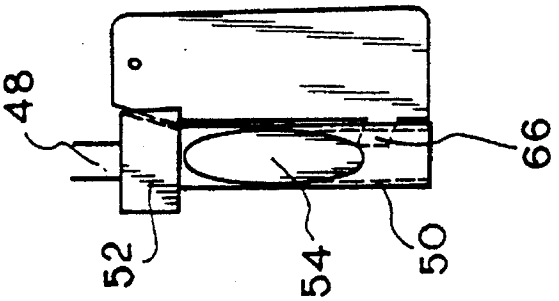

The punch member 50 comprises a hollow cylindrical member, shown in side view in FIG. 4A, 4B, and 4C, for removing a generally semicircular portion of strip material 24 from the strip material. This feature permits the strip to be bent or flexed about a corner when the same is encountered during the application of the strip material to a substrate.

The cylindrical punch 50 includes an arcuate opening 54 to permit the discharge of semicircular portions of the strip material from within punch 50. To this end, opening 54 may be directed toward the front of the tool 10 to enable the discharge of the portions from between body portion 14 and plate 20. The forward end of central body 14 may have a portion removed to provide an enlarged area to further assist in clearing the discharged portions from the tool 10.

A slot 56 is included on cylindrical punch 50 for selective cooperation with a cutting blade.

Figure 3:
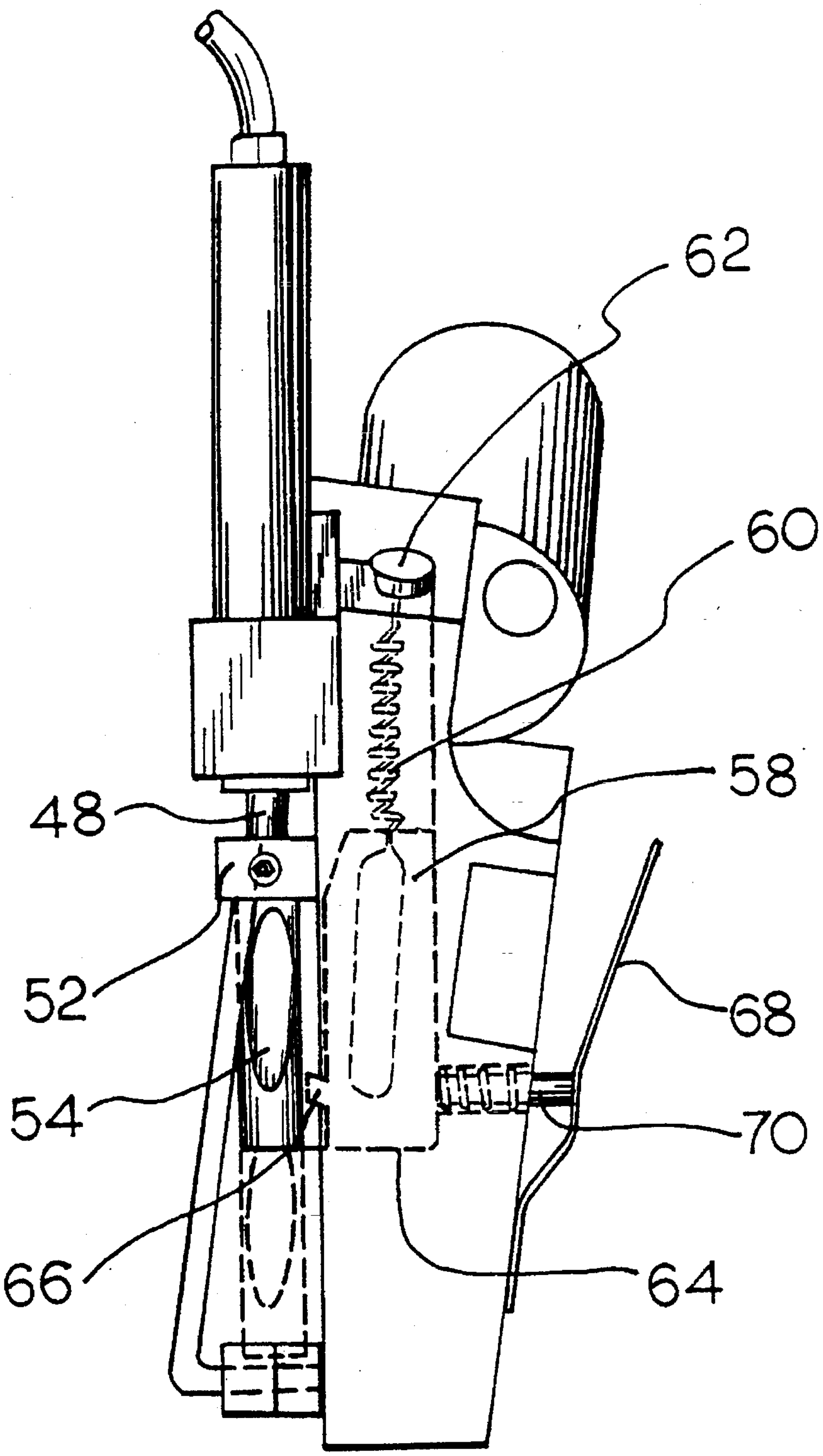
FIG. 3 is a front elevational view of FIG. 2.

A cutting blade 58 is provided and is movably mounted within central body portion 14. This is generally illustrated in FIG. 3. The blade 58 is mounted for upward and downward movement relative to the longitudinal movement of the strip material. A spring 60 is connected between the blade 58 and within body portion 14 at 62. The spring 60 biases the blade 58 to the upward position as illustrated. A cutting edge 64 is provided on blade 58 as well as a projection 66 adapted for cooperative engagement with slot 56.

An actuating member 68 is provided on body portion 14 for displacing blade 58 laterally relative to the upward or downward movement. A biased link extends between member 68 and blade 58.

In operation, strip material 24 is fed between plate 20 and body portion 14 over guide member 26 and the strip 24 applied to a substrate (not shown) while maintaining lower surface 16 out of contact with the substrate with the exception of the guided contact along a peripheral edge.

Upon reaching a corner in the substrate, rather than severing the strip at the point, the user actuates the punch member 50 by depressing switch 38. This effects movement of the punch member 50 from the non-punching position illustrated in FIG. 2, to the punching position shown in dotted lines on the same drawing. The punch member 50 abuts punch stop means 28. Once a semicircular portion is removed switch 38 is released and the punch member returns to its non-punching position. When the user reaches the final corner of the substrate, the strip must be severed. This is achieved by making use of actuating member 68. When punch member 50 is in a non-punching position, blade 58 is laterally moved by actuating member 68 such that projection 66 of blade 58 engages slot 56 of member 50. The actuation of the punch member 50 is then carried out as previously set forth. During this procedure, blade 58 moves in concert with punch member 50, the blade abutting stop means 28 and severing the strip material.

As those skilled in the art will realize, these preferred illustrated details can be subjected to substantial variation, without affecting the function of the illustrated embodiments. Although embodiments of the invention have been described above, it is not limited thereto and it will be apparent to those skilled in the art that numerous modification form part of the present invention insofar as they do not depart from the spirit, nature and scope of the claimed and described invention.

I claim:

1. A hand tool for applying strip material to a substrate having an edge and a major face comprising:

a body having a lower surface and a channel extending therethrough for receiving strip material therein;

a substrate positioning member adjacent said channel on said lower surface of said body for guiding said tool along said edge of said substrate, said lower surface of said body being elevated from said major face when said strip material is fed through said channel;

punch means slidably mounted on said body for removing a portion of said strip material; and selectively operable cutting means for cutting said strip material, said cutting means adapted for concerted movement with said punch means.

2. The hand tool as defined in claim 1, wherein said punch means comprises a slidable punch member slidably mounted on said body and adapted to remove a portion of said strip material to form a pivot point therein, said punch member being slidable from a first non-punching position wherein said punch member is spaced from said strip material, to a punching position wherein said punch member is within said strip material.

3. The hand tool as defined in claim 1, wherein said tool is adapted for connection with a source of fluid.

4. The hand tool as defined in claim 2, wherein said tool includes actuation means for effecting movement of said punch member between the first and second portions.

5. The hand tool as defined in claim 4, wherein said actuation means includes switch means.

6. The hand tool as defined in claim 4, wherein said actuation means comprises fluid actuation means.

7. The hand tool as defined in claim 6, wherein said fluid actuation means comprises pneumatic actuation means.

8. A hand tool for applying strip material to a substrate having an edge and a major face comprising:

a main body having a lower surface and a channel extending therethrough for receiving strip material;

a substrate positioning member adjacent said channel on said lower surface for guiding said tool along said edge of said substrate, said lower surface of said body being elevated from said major face when said strip material is fed through said channel;

a slidable punch member slidably mounted within said body adapted to remove a portion of said strip to form a pivot point therein, said punch member being slidable from a first non-punching position wherein said punch member is spaced from said strip material to a punching position wherein said punch member is within said strip material;

actuation means for effecting movement of said punch member between the first and second positions; and selectively operable cutting means for cutting said strip material, said cutting means adapted for concerted movement with said punch member.

9. The hand tool as defined in claim 8, wherein said actuation means includes switch means.

10. The hand tool as defined in claim 9, wherein said actuation means comprises fluid actuation means.

11. The hand tool as defined in claim 10, wherein said tool includes means for connection with a source of fluid.

12. The hand tool as defined in claim 10, wherein said fluid actuation means comprises a pneumatic cylinder having a piston, said punch member being connected to said piston.

13. The hand tool as defined in claim 8, wherein said cutting means comprises a blade, said blade being pivotally mounted within said body for movement at least partially into said channel.

14. The hand tool as defined in claim 13, wherein said blade member is adapted for releasable cooperative engagement with said punch member for concerted movement within said channel with said punch member.

15. The hand tool as defined in claim 8, wherein said tool further includes a guide wall positioned within said channel for guiding said strip material therethrough.

16. The hand tool as defined in claim 15, wherein said tool further includes a pressure roller mounted within said channel pressurably applying said strip material to said substrate.

17. A method of placing a strip of material proximate an edge of a substrate having a major face comprising the steps of:

providing a length of sealant strip from a supply thereof;

providing a hand tool having a lower surface and strip feeding channel therein angularly inclined to said lower surface;

feeding a length of said strip into said channel such that said lower surface is elevated from said major face;

effecting securement of said strip to said edge of said substrate;

punching a notch in said strip with said tool at a corner of said substrate to facilitate securement of said strip around a corner edge of said substrate; and cornering said substrate with the notched strip.

18. The method as defined in claim 17, further including the step of severing said strip.

* * * * *